INVENTOR.
JOHN E. TYLER

April 27, 1965 J. E. TYLER 3,180,210
INSTRUMENT FOR MEASURING VOLUME ABSORPTION COEFFICIENTS
OF HORIZONTALLY STRATIFIED WATER
Filed July 18, 1961 2 Sheets-Sheet 2

INVENTOR.
JOHN E. TYLER
BY
ATTORNEYS

United States Patent Office 3,180,210
Patented Apr. 27, 1965

3,180,210
INSTRUMENT FOR MEASURING VOLUME ABSORPTION COEFFICIENTS OF HORIZONTALLY STRATIFIED WATER
John E. Tyler, La Jolla, Calif., assignor, by mesne assignments, to the United States of America as represented by the Secretary of the Navy
Filed July 18, 1961, Ser. No. 125,019
9 Claims. (Cl. 88—23)

The present invention relates generally to optical measuring instruments and specifically to a method and means for measuring the volume absorption coefficient of horizontally stratified water.

In the field of oceanography, it has been determined that the radiative transfer within a hydrosol such as, for example, sea water, lake water, fresh water, the atmosphere, or any other scattering-absorbing medium, can best be described by means of the inherent and apparent optical properties thereof. Moreover, in many instances, it has been found that these optical properties are of considerable importance in the solution of the various and sundry problems having to do with photography, human vision, television, etc., within such mediums. The optical properties which appear to be of importance at the present state of the art are the values of the scattering coefficient, the absorption coefficient, and the total attenuation coefficient, which, of course, is the sum of the scattering and absorption coefficients. Of paramount importance in determining contrast characteristics of objects submerged in water is the light absorption coefficient, the parameter which is measured and indicated by the system constituting the subject invention.

Although instrumentation has been devised to measure the total light attenuation coefficient in water, none is known which measures and directly reads out the volume absorption coefficient for light therein or in other hydrosol or aqueous environments.

It is, therefore, an object of this invention to provide a system for measuring the volume absorption coefficient for light in stratified water.

Another object of this invention is to provide an improved means for predicting and determining the visibility of objects submerged at various depths within water.

A further object of this invention is to provide methods and means for facilitating underwater research activities.

A still further object of this invention is to sample indications of probable optical resolution at various water depths.

Another object of this invention is to provide a new and useful oceanographic instrument for effectively determining underwater light conditions without employing the observations of a human diver to determine same.

Another object of this invention is to facilitate efficient underwater diving operations.

Another object of this invention is to reduce the cost of underwater research and diving activities as a result of measuring, indicating, and predicting optimum submarine conditions for such activities before they actually commence.

A further object of this invention is to provide a light absorption coefficient meter that will function in any laminated, stratified, light scattering-absorbing medium.

A still further objective of this invention is to provide an improved oceanographic instrument for measuring the optical properties of sea water relative to the penetration and transfer of electromagnetic energy therethrough in the ultra violet, visual, and infrared spectrum frequency ranges.

Another object of this invention is to provide an improved oceanographic instruments for effectively measuring irradiance resulting from natural light at various water depths.

Another object of this invention is to provide an oceanographic instrument for effectively determining the optical density of a hydrosol such as, for instance, ocean or lake water.

Another object of this invention is to provide methods and means of measuring downwelling radiant flux, upwelling radiant flux, and spherical or scaler irradiance within an aqueous medium in situ.

Another object of this invention is to provide an electro-optical probe for converting measured flux for downwelling, upwelling, and spherical irradiance of a given ambient environmental medium into respective analog signal parameters which may be processed further by computer means to effect readout of predetermined physical characteristics of said ambient environmental medium.

A further object of this invention is to provide a single-probe, single-phototube absorption meter that is mechanically, electrically, and optically simple and economical to construct and maintain.

Still another object of this invention is to provide an improved oceanographic instrument for the measurement of the volume absorption coefficient for light of horizontally stratified water that creates a minimum perturbation of the light field.

Another object of this invention is to provide an absorption coefficient meter that is light in weight, portable, and easily calibrated.

Other objects and many of the attendant advantages of this invention will be readily appreciated as the same becomes better understood by reference to the following detailed description when considered in conjunction with the accompanying drawings in which like reference numerals designate like parts throughout the figures thereof and wherein.

Figure 1:
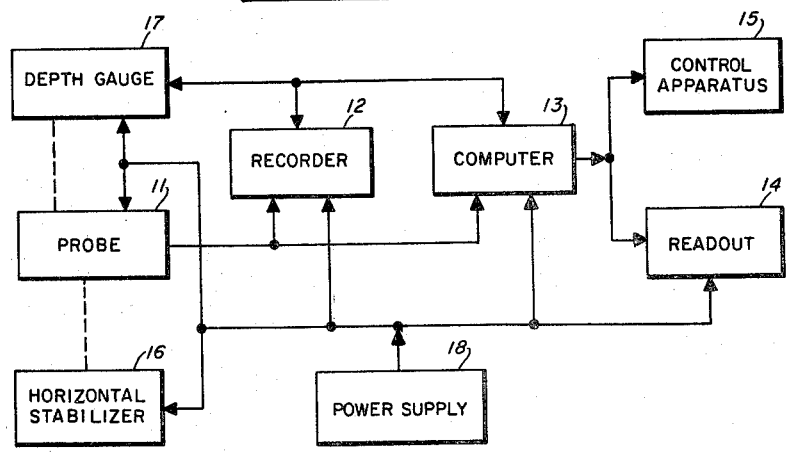
FIG. 1 is a block diagram of the absorption coefficient meter system constituting a preferred embodiment of the subject invention.
Figure 2:
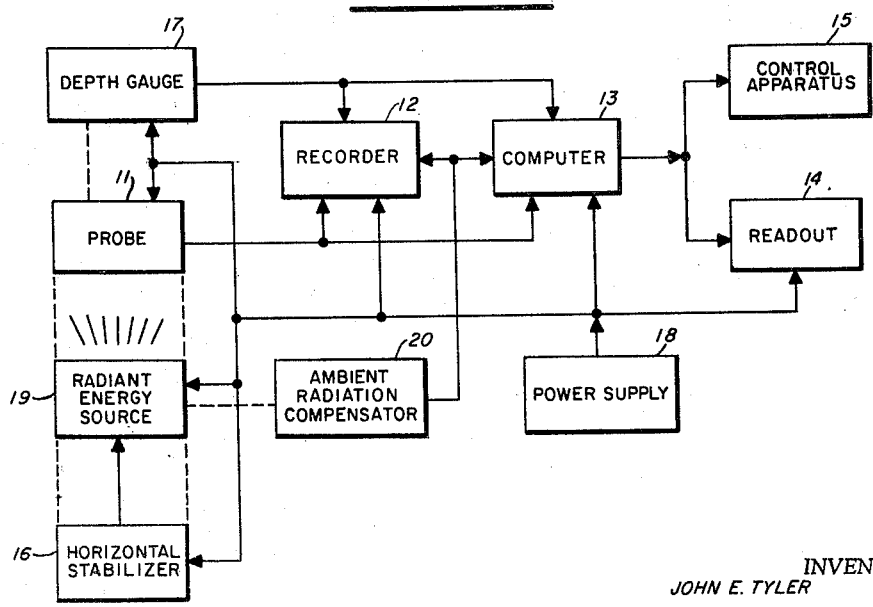
FIG. 2 is a block diagram of another preferred embodiment of the invention, having a calibrated standard light source and an ambient light compensator incorporated therein.

Referring now to the drawing, there is shown in FIGS. 1 and 2 an opto-electrical radiant energy probe 11 of the type which senses electromagnetic energy such as, for example, light energy or the like from various predetermined directions within an aqueous, subaqueous, or the other scattering-absorbing medium and converts it to proportional electrical output signals in accordance with a given sequential scanning operation, as will be fully explained in conjunction with a more detailed drawing figure thereof, subsequently.

These output signals are consecutively or successively applied to any preferred conventional recorder 12 that will indicate the individual levels thereof. Also, they are fed to any suitable analog or digital computer 13 of, for instance, the IBM 702 type or the like for further processing to compute the desired light absorption coefficient or other parameters of value at that particular location in the environmental medium.

The output of computer 13 is fed to an appropriate readout apparatus 14 which indicates said absorption coefficient or other information in such terms as to be intelligible and useful to the human operator operating the invention. Readout 14 may, for instance, be a conventional counter which is calibrated to provide a numerical output directly readable as the volume absorption coefficient of the environmental medium where probe 11 is located. Likewise, the output of computer 13 is or may be applied to a control apparatus 15 which may be employed to regulate any other pertinent equipment having a relationship with the aforementioned absorption coefficient or any other parameters being sensed by probe 11.

A horizontal stabilizer 16 is structurally connected to probe 11 to keep it oriented substantially horizontal within the sea water or other environmental medium within which it is suspended so that response thereof will be to the light or other radiant energy located at a particular strata of said medium. Actually, any well known arrangement for so doing may be employed, such as a balanced-torque mounting arrangement if exceptionally strong currents are encountered, even though the supporting cable may have a high wire angle. Or, under some circumstances, the simple expedient of attaching a pendulum to the bottom of the probe will suffice to maintain it in a substantially stabilized horizontal position or, at least, tend to dampen any deviations therefrom, so that any errors resulting from such deviations will be minimized and probably be negligible for most practical purposes. Of course, static weight balancing of the various elements of the probe itself as well as inertial weight balancing of the entire probe would ostensively assist in the desired horizontal disposition thereof.

A depth gauge 17 is also structurally attached to or associated with probe 11 in such manner that both will be located at the same water depth simultaneously. The output signal therefrom represents the depth which gauge 17 and probe 11 are submerged within the predetermined environmental medium at any given instant, and this signal is likewise applied to recorder 12 and computer 13 for indication and computation purposes, respectively. These arrangements, of course, enable the operating scientist to continuously ascertain the depth at which radiant energy is being sensed without encountering the delay of making and correlating depth measurements obtained by other methods with the probe output parametric signals.

As is appropriate, electrical power is supplied to all of the aforementioned elements by a power supply 18. In the alternative, however, each element or unit may contain its own power supply if operation thereof under certain conditions indicates that it is more feasible or expeditious to do so, and making the correct choice with respect thereto or any desired combination thereof would obviously be within the purview of the artisan.

The embodiment of the subject invention depicted in FIG. 2 is similar to that of FIG. 1 with two exceptions, one being that a calibrated standard radiant energy source 19, such as, for example, a light source, is further incorporated within the system by structural attachment to both probe 11 and horizontal stabilizer 16 for minimum functional interference therebetween. It, too, is powered by power supply 18. Probe 11 and radiant energy source 17, of course, functionally interact to produce desired optimum readout results and should be so disposed as to allow predetermined knowledge and adjustment of the distance between them. The other exception is that an ambient radiant energy compensator 20 which may, for instance, be any appropriate conventional light meter is connected to or associated with the support structure of probe 11 and radiant energy source 19 in such manner as to make compensating adjustments for any existing ambient energy (such as spurious sunlight) that may have an adverse effect on the sensing operation of probe 11 at any level within the environmental medium which, in turn, may ultimately cause erroneous readings to occur at the readout. Accordingly, the output of ambient radiation compensator 20 is fed also to recorder 12 and to computer 13 for appropriate processing therein.

Although not shown in the drawing, a carrier vessel is usually used to carry the data processing portion of the invention such as the recorder, computer, power supply, readout, and control apparatus while the probe and its associated components such as the depth gauge, horizontal stabilizer, and radiant energy source and ambient radiation compensator, if any, are suspended by a cable or other suspension means from said carrier vessel.

Figure 3:
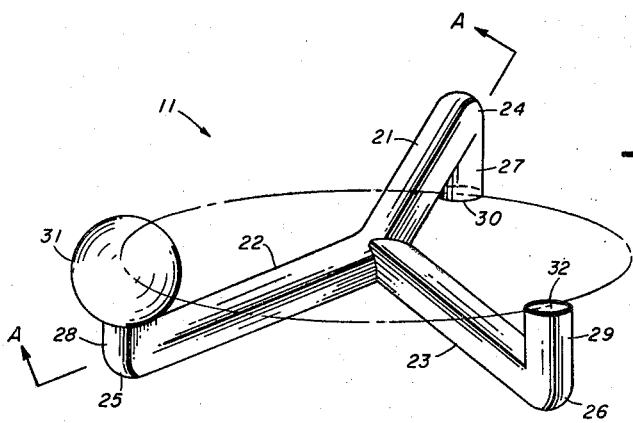
FIG. 3 is a pictorial view of the electro-optical probe portion of the subject invention.

FIG. 3 depicts probe 11 in pictorial view as having a trio of symmetrically spaced arms 21, 22, and 23, preferably with their axes all in one plane, and with elbows 24, 25, and 26 and parallel extensions 27, 28 and 29 respectively attached thereto. Disposed within the ends of said extensions are an upwelling irradiance collector 30, a spherical irradiance collector 31, and a downwelling irradiance colllector 32, the relative physical relationship of which will be described more fully in conjunction with FIG. 4.

Figure 4:
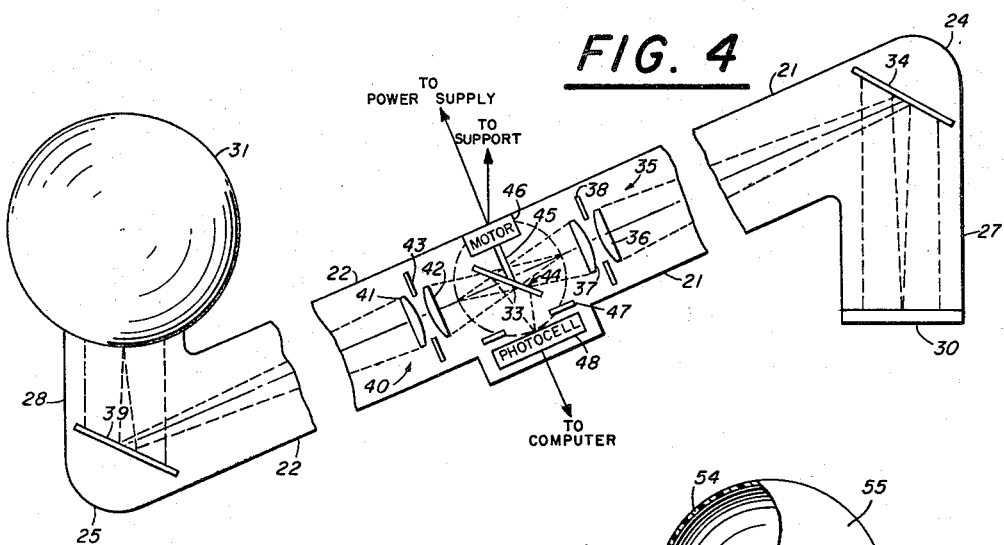
FIG. 4 is a detailed diagrammatical elevational view of the electro-optical probe of FIG. 3 taken along axes A—A.

FIG. 4, being an elevational cross-sectional view taken along axis A—A of FIG. 3, only shows two of the aforementioned arms and associated elements, with the downwelling irradiance elbow-extension-collector assembly being omitted therefrom. However, said assembly is identical to the upwelling irradiance elbow-extension-collector assembly except that it is inverted with respect thereto and is connected to an upwardly extending arm. Thus, only the diagrammatical physical structure of the upwelling assembly will herein be described in detail along with the spherical irradiance collector assembly.

Referring now to FIG. 4, probe 11 is shown as having arms 21 and 22, elbows 24 and 25, extensions 27 and 28, an upwelling irradiance collector 30 and a spherical irradiance collector 31 respectively mounted thereon. Arms 21 and 22, elbows 24 and 25, and extensions 27 and 28 are each hollow, cylindrical, tubular structures integrally connected together in such manner as to provide light paths therethrough along the axes thereof from a central point 33. Said arms including the aforementioned arm 21 are all located with their axes in the same plane with said plane so tilted that the surfaces of the upwelling and downwelling irradiance plate type collectors, the center of the spherical irradiance collector, and the aforementioned central point 33 all lie in the same horizonal plane.

Upwelling irradiance collector 30 is disposed within the hollow end of extension 27 with its collecting surface flush therewith and normal to the longitudinal axis thereof. It may be made from 1/16 inch Rohm and Haas #7420 diffuse plastic or the equivalent thereof cemented to a clear plastic disc, if so desired, to provide mechanical strength. The outer surface thereof that is exposed to the ambient environment is rough ground with 1–F emery until it is translucent and, hence, optically performs the integration $$H = \int_0^{\pi/2} N \cos \theta\, dw$$

where:

$\pi/2 = 90°$ angle $N =$ the vector quantity, radiance, or watts per unit solid angle per unit area from direction $\theta$ $\theta$ is the angle between the vertical to the collector surface and the direction from which radiance arrives $w =$ the solid angle of summation $= \sin \theta d\theta d\phi$, where:

$\phi$ is the zenith angle; and $H =$ the desired irradiance.

The flux acceptance properties of a typical irradiance collector of the type employed in this invention is not the same when the front surface is ground as when it is polished. Actually, grinding as defined above increases the directional acceptance factor sufficiently to make it exceedingly useful for the present purposes in the subject invention.

Scaler irradiance is determined by spherical collector 31 whose outer surface may likewise be ground with 1–F emery to be translucent and, hence, a cosine collector at every point thereon. It will, hence, collect radiant energy in proportion to a quantity called spherical irradiance by optically performing the integration $$h_{4\pi} = \int N dw -$$ (all directions around the sphere)

where:

$N$ = the vector quantity, radiance, or watts per unit solid angle per unit area from direction $\theta$,
$w$ = solid angle of summation = $\sin \theta d\theta d\phi$,
where $\phi$ is the zenith angle and $\theta$ the horizontal azimuth angle.
$h_{4\pi}$ = spherical irradiance Because spherical radiance ($h_{4\pi}$) is related to scaler irradiance ($h$) by the equation:

$$h_{4\pi} = \frac{1}{4} h$$

where $h$ = scalar irradiance, such a translucent sphere can thus be used to make the measurement of scalar irradiance with sufficient accuracy to be useful for most practical purposes, if calibrated and corrected by the proper constant. But, a spherical collector incorporates a small inherent inaccuracy because its top and bottom are at different depths. Hence, some compromise must be reached on the size of sphere to be selected for this measurement. From experiment it is known that if:

$h_{(Z1)}$ = total spherical irradiance at depth Z1,
$h_{(Z2)}$ = total spherical irradiance at depth Z2,
$e$ = natural logarithm base = 2.302585,
$D$ = the diameter of the spherical collector, $K$ = the diffuse attenuation function = $\frac{h_{(Z1)}}{h_{(Z2)}} = e^{+K \Delta z}$ where:

$h_{(Z2)}$ and $h_{(Z1)}$ are measured spherical irradiances at two depths, Z1 and Z2, by a spherical type cosine radiation collector, and $\Delta Z$ is the distance between said measurement depths, then the optimum size or diameter D of the spherical collector for most practical purposes may be obtained from the equation:

$$\frac{h_{(Z1)} - h_{(Z2)}}{h_{(Z2)}} = e^{KD} - 1$$

Disposed within the portions of said tubular sections is a plurality of optical elements for transferring or transmitting the amount of radiant energy flux received by each of the aforesaid collectors to the aforementioned central point 33. This is achieved in arm 21 by means of a reflector 34, such as a mirror or a suitable reflecting prism or the like, positioned in elbow 24 and a lens 35, which, for example, may be an f:2 lens comprising lenses 36 and 37 with a factory-adjustable diaphragm or aperture 38 mounted therebetween. It is achieved in arm 22 by means of a reflector 39, such as a mirror or suitable reflecting prism or the like, positioned in elbow 25 and another lens 40, which for example, may also be an f:2 lens comprising lenses 41 and 42 with a factory-adjustable diaphragm or aperture 43 mounted therebetween. Although not shown, arm 23 likewise contains similar optical elements disposed therein in a similar manner.

At the aforementioned central point of the subject probe is a rotating reflector 44, of either the mirror or prism type, which is mounted on a shaft 45 driven by a motor 46 for timely and sequentially directing the flux received thereby through another adjustable stop or aperture 47 to a photocell or phototube 48 of any pertinent energy conversion type. For maximum convenience, the axis of rotation of said rotating reflector is perpendicular to the plane in which lie the optical axes of the three arms. As previously mentioned, each of the aforesaid apertures are adjustable and it should be understood that they are so made to permit optically setting the three collectors in relative calibration and to control the amount of flux received by phototube 48.

Although probe 11 is disclosed in FIG. 4 diagrammatically, it should be understood that all mechanical, optical, and electrical materials, connections, and joints thereof must be water tight so that it may be submerged within sea water or the like, or disposed in any other predetermined environmental medium without adversely affecting the operation thereof.

With exception of probe 11, all of the other components are conventional and well known per se. It is, therefore, their arrangement, combination, and interaction that produces the new and useful results obtained by this invention.

Figure 5:
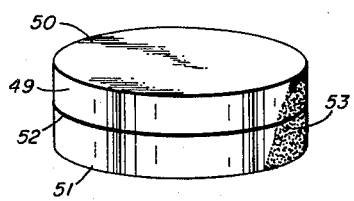
FIG. 5 is a pictorial view of an exemplary collector that may be used as the upwelling and downwelling irradiance collectors in the present invention.

Referring now to FIG. 5, an exemplary embodiment of disc collector 30 is shown. As previously mentioned, merely inverting it structurally makes it possible to be employed as either an upwelling irradiance collector or a downwelling irradiance collector. This collector includes a transparent collector disc 49 having a translucent-ground radiant energy gathering surface 50 which collects light or other pertinent energy in accordance with the integration defined in the explanation presented in the general description of probe 11 and FIG. 4. It may be made of plastic, glass, or other material having suitable strength and optical properties. For strength purposes, a support disc 51 that is transparent and otherwise has suitable strength and optical characteristics is or may be cemented to the unroughened side of disc 49 by means of conventional appropriate lens cement 52. Although any conventional, well known lens mounting means may be employed for attaching it to the end of the tubular extension, it should be done in such manner as to provide a watertight seal and minimum optical interference therebetween. For this purpose, an appropriate cement 53 may be used, if desired.

Figure 6:
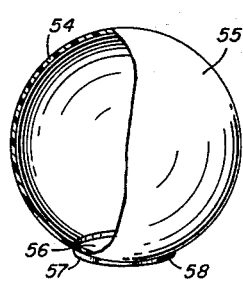
FIG. 6 is a pictorial view with parts broken away of an exemplary collector that may be used as the scalar irradiance collector in the present invention.

FIG. 6 shows an exemplary embodiment of scalar irradiance collector 31 that may be incorporated in the subject invention. It includes a transparent peripheral globe having a wall 54 which, in turn, has an outside surface 55 ground to be translucent in order to collect light or other radiant energy in accordance with the integration previously mentioned. At the lower periphery, an aperture 56 for passing radiant flux is incorporated, and a mounting ring or neck 57 is disposed surrounding said aperture for attaching the entire spherical irradiance collector to its respective tubular extension. Such attachment should also be sealed in such manner as to be watertight, and for this purpose, any conventional appropriate mounting means such as cement 58 or any combination thereof may be employed.

Briefly, the subject invention operates in the following manner:

Although, as noted in the objects, this invention has numerous uses, it is primarily intended for measuring the volume absorption coefficient of light within various depth strata of sea water. Its operation, as disclosed herein, will be confined substantially thereto for the sake of brevity and simplicity, but it should be understood that its overall usefulness is not so limited, and that its use in conjunction with other functions and operational mediums would be well within the purview of one skilled in the art and, accordingly, is intended to be included in the scope and spirit of the teachings of this invention.

Probe 11 and its associated components such as, for example, the depth gauge, the horizontal stabilizer, and the radiant energy source and ambient radiation compensator are lowered into the ocean from a carrier vessel such as a suitable ship or aircraft by means of a cable and winch arrangement or by any other convenient conventional manner. Once the probe is lowered to the desired depth, it will sequentially transmit electrical signals from the photocell thereof which represent the upwelling, downwelling, and scalar irradiance received thereby from the strata of water at said depth.

The ambient light level at which the subject instrument must operate is usually influenced by the time of day, the state of the sky, and the depth at which it is operating. Under typical sunny-day lighting conditions, the values of the upwelling irradiance, downwelling irradiance, and scalar irradiance will be, for example, in the ratio of 1:44:60. Of course, the signals received by the phototube will be in the same ratio for this example if the instrument is in correct adjustment having been adjusted by means of apertures similar to apertures 38 or 43 in FIG. 4. As long as the instrument is in the useful depth region, no great variation should be expected in these ratios. Therefore, in order to determine the absorption coefficient at any depth where flux is not the limiting factor, the subject instrument should incorporate features that will result in maximum signal-to-noise ratio, make sequential light measurements which can be expected to vary from each other by a factor of about one hundred to one, provide suitable amplification and stable gain adjustments which will permit operation over a very large range of ambient light levels, and provide simultaneous determination of depth by means of a pressure transducer.

The downwelling, upwelling, and scalar irradiance flux is received by the respective collectors, reflected by the reflectors located in respective elbows, magnified, focused, and regulated by the respective lens-aperture arrangements, and reflected, in turn, by the rotation of motor-driven reflector 44 through aperture 47 to phototube 48. Phototube 48 then converts the flux received from each of the aforementioned collectors into proportional electrical signals which are transmitted via electrical conductors to recorder 12 and computer 13 on board the carrier vessel. Likewise, depth gauge 17 converts the pressure equivalent of the depth at which it is located at any given instant into a proportional electrical signal that is also transmitted via electrical conductors to recorder 12 and computer 13. These four output signals have their respective levels timely recorded by recorder 12. These data may then be used to manually calculate the volume absorption coefficient by using the equation $$a_{(Z)} = \frac{1}{h_{(Z)}}\left[\frac{d}{dZ}(H_{uZ}) - \frac{d}{dZ}(H_{DZ})\right]$$

where:

$a_{(Z)}$ = volume absorption coefficient at depth Z,
$h_{(Z)}$ = scalar irradiance at depth Z,
$\frac{d}{dZ}(H_{uZ})$ = the derivative of the sensed upwelling irradiance at depth Z,
$\frac{d}{dZ}(H_{DK})$ = the derivative of the sensed downwelling irradiance at depth Z.

In addition, these data may be processed automatically by computer 13 and read out directly by readout 14 or otherwise used to regulate associated control apparatus 15, if any.

In event the embodiment of FIG. 2 is used, the operation is similar to that of the embodiment of FIG. 1 with the exception that light from a properly positioned, calibrated standard light source is or may be switched in and used at the discretion of the operator to provide the radiant energy instead of using natural sunlight. In this case, the volume absorption coefficient may be obtained at greater depths or at any convenient time of the day, regardless of ambient sunlight conditions. An ambient radiation compensator may also be switched in and employed in this instance, if so desired, to correct for any spurious ambient light that may exist in the vicinity of the probe which would adversely affect the volume absorption coefficient measurements being made. The latter should also be hooked up electrically so that it may or may not be so used at the discretion of the operator.

Obviously, many modifications and variations of the present invention are possible in the light of the above teachings. It is, therefore, to be understood, that within the scope of the appended claims, the invention may be practiced otherwise than as specifically described.

What is claimed is:
1. A probe for sensing upwelling, downwelling, and scalar irradiance parameters within a predetermined environmental medium comprising in combination, a trio of watertight, hollow, thin-walled, tubular arms interconnected so their longitudinal axes of revolution meet at a common junction, a scalar irradiance collector with a substantially spherical translucent external radiant energy collecting surface attached to one of said arms, a first disc collector with a substantially flat translucent radiant energy collecting surface facing in an upwardly direction attached to another of said arms, a second disc collector with a substantially flat translucent radiant energy collecting surface facing in a downwardly direction attached to the remaining one of said arms, said scalar collector having a center that is located in a plane common to the translucent flat surfaces of said disc collectors and the common junction of the longitudinal axes of revolution of said interconnecting arms, means contiguously disposed with the aforesaid common junction for generating electrical output signals in response to received radiant energy and in proportion to the intensity thereof, and means disposed within said arms for sequently sampling the radiant energy collected by each of said irradiance collectors and transmitting same to the aforesaid electrical output signal generating means in accordance with a predetermined sampling frequency.

2. The invention according to claim 1 wherein each of said first and second disc collectors consist of a solid plastic cylinder having one of the flat surfaces thereof ground to form said flat translucent radiant energy collecting surface.

3. A probe for sensing upwelling, downwelling, and scalar irradiance parameters within a subaqueous medium comprising, a trio of watertight, hollow, thin-walled, tubular arms interconnected so that their longitudinal axes of revolution meet at a common junction, an elbow attached to the outer extremity of each of said trio of arms, a trio of tubular extensions having parallel axes of revolution mounted on said elbows, respectively, with said parallel axes of revolution angularly disposed with respect to the longitudinal axes of revolution of said tubular arms, a scalar irradiance collector mounted on the end of an upwardly extending one of said trio of tubular extensions, an upwelling irradiance collector mounted on a downwardly extending one of said trio of tubular extensions, a downwelling irradiance collector mounted on another upwardly extending one of said two of tubular extensions, means contiguously disposed with said common junction for generating electrical output signals in response to received irradiance signals, and means disposed within the hollow portion of said tubular arms for transferring the radiant energy collected by said scalar, upwelling, and downwelling irradiance collectors to the aforesaid electrical output signal generating means.

4. The device of claim 3 wherein the center of said scalar irradiance collector, said upwelling irradiance collector, said downwelling irradiance collector, and the common junction of the longitudinal axes of revolution of said interconnected arms are structurally disposed within the same plane.

5. The device of claim 3 wherein said scalar irradiance collector comprises a hollow, thin-walled, substantially spherical globe having an aperture therein of a diameter that is substantially comparable to the inside diameter of the upwardly extending tubular extension on which it is adapted to be mounted, said globe having an external surface that is translucent and ground so that all points thereon act as a collector for ambient radiant energy exposed thereto and an inside surface that is polished and transparent, and means disposed about the periphery of said aperture adapted for fixedly connecting said globe to the end of said upwardly extending extension in a watertight association and with the center of said globe in line with the longitudinal axis of said extension.

6. The device of claim 5 wherein said upwelling and downwelling irradiance collectors each have a substantially cylindrical configuration with a diameter substantially equal to the inside diameter of the respective downwardly and upwardly extensions on which same are adapted to be mounted, said collector having a pair of flat, parallel end surfaces, one of which is translucent and ground so that all points thereon act as a collector for ambient radiant energy exposed thereto and the other of which is polished and transparent, and means attached to each of said collectors for fixedly mounting same on the ends of the respective extensions in watertight association.

7. The device of claim 5 wherein said means contiguously disposed with said common junction for generating electrical output signals in response to received irradiance signals comprises a phototube.

8. The device of claim 5 wherein said means disposed within the hollow portion of said tubular arms for transferring the radiant energy collected by said scalar, upwelling, and downwelling irradiance collectors to the aforesaid electrical output signal generating means comprises a plurality of reflectors interposed between said collectors and said generating means, a plurality of lenses interposed between each of the reflectors of said plurality of reflectors, and an adjustable stop interposed between each of the lenses of said plurality of lenses.

9. The device of claim 8 further characterized by having one of said plurality of reflectors mounted for rotation at substantially the aforesaid common junction of the longitudinal axes of revolution of said tubular arms, a shaft attached thereto at the side opposite the reflective side thereof, and a drive motor means connected to said shaft for rotating same and said reflector.

References Cited by the Examiner
UNITED STATES PATENTS
2,727,997  12/55  Schofield _____ 88—1

OTHER REFERENCES

Nephelometer for the Measurement of Volume Scattering Function in Situ, Tyler and Richardson, vol. 48, pages 354 to 357, Journal of the Optical Societey of America, May 1958.

Scattering of Daylight in the Sea, Utterback and Jorgensen, vol. 26, pages 257–261, Journal of the Optical Society of America, June 1936.

A Submarine Photometer for Studying the Distribution of Daylight in the Sea, Utterback and Higgs, vol. 28, pages 100 to 102, Journal of the Optical Society of America, April 1938.

JEWELL H. PEDERSEN, *Primary Examiner.*